(12) United States Patent
Foster

(10) Patent No.: US 9,425,981 B2
(45) Date of Patent: Aug. 23, 2016

(54) REMOTE ACCESS CONTROL TO RESIDENTIAL OR OFFICE BUILDINGS

(76) Inventor: Colin Foster, New York, NY (US)

( * ) Notice: Subject to any disclaimer, the term of this patent is extended or adjusted under 35 U.S.C. 154(b) by 883 days.

(21) Appl. No.: 13/548,279

(22) Filed: Jul. 13, 2012

(65) Prior Publication Data

US 2013/0017812 A1 Jan. 17, 2013

Related U.S. Application Data

(60) Provisional application No. 61/507,605, filed on Jul. 14, 2011.

(51) Int. Cl.
| | | |
|---|---|---|
| *H04L 12/28* | (2006.01) | |
| *H04M 11/02* | (2006.01) | |
| *H04N 7/18* | (2006.01) | |
| *G08B 25/08* | (2006.01) | |
| *H04L 29/08* | (2006.01) | |

(52) U.S. Cl.
CPC ........ *H04L 12/2825* (2013.01); *H04M 11/025* (2013.01); *H04N 7/186* (2013.01); *G08B 25/08* (2013.01); *H04L 67/04* (2013.01)

(58) Field of Classification Search
CPC .................................................. H04L 12/2825
USPC ........... 455/417, 422.1; 340/5.4; 379/167.01, 379/167.02, 167.03, 167.04, 167.05, 379/167.06, 167.07, 167.08, 167.11, 379/167.12, 167.13, 167.14, 167.15, 168, 379/169, 170, 171, 172, 173
See application file for complete search history.

(56) References Cited

U.S. PATENT DOCUMENTS

| | | | |
|---|---|---|---|
| 4,608,785 A * | 9/1986 | Rhodes et al. ................. | 52/2.17 |
| 5,537,465 A | 7/1996 | Bellafiore | |
| 6,603,842 B2 | 8/2003 | Elberbaum | |
| 6,995,664 B1 | 2/2006 | Darling | |
| 6,999,825 B2 | 2/2006 | Inomata | |
| 7,015,806 B2 | 3/2006 | Naidoo et al. | |
| 7,356,139 B2 | 4/2008 | Turcan et al. | |
| 2001/0031129 A1 * | 10/2001 | Tajima .................. | H04N 5/782 386/241 |
| 2004/0170262 A1 * | 9/2004 | Ohno ....................... | 379/167.12 |
| 2004/0229569 A1 * | 11/2004 | Franz ........................... | 455/66.1 |
| 2006/0190419 A1 * | 8/2006 | Bunn ................... | G06N 99/005 706/2 |
| 2007/0085662 A1 * | 4/2007 | Matsumoto et al. ........ | 340/10.1 |
| 2007/0206001 A1 | 9/2007 | McKay | |
| 2008/0069326 A1 * | 3/2008 | Chang ...................... | 379/167.11 |
| 2008/0163361 A1 * | 7/2008 | Davis ...................... | G06F 21/31 726/19 |
| 2009/0141117 A1 | 6/2009 | Elberbaum | |
| 2010/0128931 A1 * | 5/2010 | Bongard ...................... | 382/105 |
| 2010/0171589 A1 * | 7/2010 | Haberli ................... | E05B 47/00 340/5.82 |
| 2011/0007156 A1 * | 1/2011 | Sankaranarayanan | G08B 25/008 348/143 |
| 2011/0025852 A1 * | 2/2011 | Tanaka ........................ | 348/156 |
| 2011/0061100 A1 * | 3/2011 | Mattila ................... | G06F 3/017 726/17 |

(Continued)

*Primary Examiner* — Christopher M Brandt
(74) *Attorney, Agent, or Firm* — Georgiy L. Khayet

(57) ABSTRACT

Disclosed are computer-implemented methods and systems for providing remote access control to residential or office buildings. The disclosed methods allow employing virtual doorman functions in non-doorman buildings. An example method may comprise: receiving a call signal of an intercom station, the call signal comprising a resident identifier which indicates a resident with whom a visitor is trying to communicate, receiving a video stream generated by at least one camera, the video stream comprising one or more images of the visitor, retrieving visitor data associated with the resident identifier, the visitor data comprising one or more visitor profiles, and providing access to the building for the visitor based upon one or more predetermined criteria.

15 Claims, 13 Drawing Sheets

(56) References Cited

U.S. PATENT DOCUMENTS

2012/0028589 A1* 2/2012 Fan et al. ............... 455/90.2
2013/0031611 A1* 1/2013 Barreto ............... G06Q 10/06 726/4

* cited by examiner

REMOTE ACCESS CONTROL TO RESIDENTIAL OR OFFICE BUILDINGS

CROSS-REFERENCE TO RELATED APPLICATIONS

This application claims the benefit of U.S. Provisional Patent Application Ser. No. 61/507,605, filed on Jul. 14, 2011, which is titled "Techniques For Providing Remote Access Control to Premises", and which is incorporated herein by reference in its entirety for all purposes.

TECHNICAL FIELD

This disclosure relates generally to security systems, and more particularly, to the technology for providing remote access control to premises such as multi-apartment residential buildings or office buildings.

DESCRIPTION OF RELATED ART

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

Nowadays, many people resort to different steps to provide security to their residential and office premises. One option is to employ guard also known as doormen who watch over the premises. Though doormen do not necessarily act as a security guard, they can call into question the entry of people who are not supposed to be in a residential or office building. The doormen do not only open doors, but get to know the tenants and residents of the buildings, which they watch over, their friends or family members, who frequently visit the tenants, provide other courtesy and security services. The doormen may also be responsible for managing and screening deliveries on behalf of the residents, signing packages, carrying luggage, hailing taxis, and so forth.

However, doormen services may be quite expensive. Therefore, those tenants who can not afford to employ a doorman prefer using intercom systems. As a rule, the intercom systems provide two-way audio communication between a person inside a particular apartment or office and a visitor outside the building. When the person inside the apartment or office identifies the visitor, he or she can remotely open the door for the visitor to come in. Thus, the person inside the premise can partly act as a doorman.

At the same time, the use of the intercom systems also has some drawbacks. One of them is that the person must be inside the apartment or office in proximity to one of the intercom systems in order to be able to communicate with the visitor being outside the building. If there is nobody nearby the intercom system, e.g., when there is nobody at the apartment or office, no communication with the visitor outside the premise is possible and the resident will likely be unaware that someone came to the building. Another drawback is that the installation of such systems can be complicated and usually requires skilled technicians to make the installation, which leads to additional time and money outlays.

In view of at least the above-stated problems, there is still a need for providing a new easy-to-operate security system which would perform the twenty-four-hour remote monitoring of residential or office building without having to employ doormen and to require someone inside the apartment or office to open the door or manage deliveries.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The technology disclosed herein relate to computer-implemented methods and systems for providing remote access control to residential or office building. This technology allows residents in non-doorman premises not only to enjoy better security at a favorable price, but also to perform visitor management and mail delivery for the cases when the residents are not at their apartments or offices. The term "visitor", as used herein, relates to one or more of a visitor, tenant family member, tenant friend, clean worker, repair worker, courier, client, and the like.

According to the present teachings, one or more entrances of residential or office building is provided with an intercom station equipped with an input unit (such as a keypad and/or microphone), one or more video cameras, one or more actuators, and a communication unit including at least a microphone and a speaker. When a visitor willing to enter the building to see a particular resident, the visitor may press a corresponding button on the intercom station so as to communicate with the resident. If the called resident is at his or her apartment or office, the resident may communicate with the visitor over a communication device mounted inside the apartment or office. If the resident identifies the visitor and wants him to come in, the resident may remotely control the one or more actuators to open a front door.

If the resident called by the visitor is not in the apartment or office, on the expiry of a certain period of time elapsed after the moment of the unsuccessful visitor attempt to communicate with the resident, the call signal may be forwarded either to a mobile device of the resident or a remotely located control system. In the case when the call is forwarded to the mobile device, such as a smart phone or cellular phone, the resident may remotely communicate with the visitor, watch streaming video from one or more video cameras, and remotely trigger the one or more actuators so that the visitor may enter the building, apartment and/or office. Alternatively, or when the visitor cannot use the mobile device to communicate with the visitor, there is established a communication link between the visitor and an operator of the remotely located control system. The operator may also watch the streaming video originated from the one or more video cameras and speak to the visitor. The control system has a database which stores information about tenants, residents, and possible visitors. The control system may automatically retrieve information regarding the visitor for reviewing by the operator. This information may comprise, for example, the resident name, photo, address (including the number of the tenant apartment), and names and/or photos of people to be provided with access to the resident apartment or office in case if the resident is not therein. With such information, the operator and/or the control system can identify whether the visitor is a permitted person stated by the resident. If the identification of the visitor is successfully performed, the operator and/or the control system allows the visitor to come into the building and then the resident apartment by opening or unlocking corresponding doors with the aid of special actuators. It is very important that the operator can open only one or more doors which are shown on the screen, i.e. which are within the vision of the at least one video camera. This can help the operator avoid mistakes relating to opening wrong doors.

Accordingly, the control system may grant access for visitors to enter the building and optionally apartments or offices based upon predetermined criteria pre-set by the residents or building managers. It should be also noted that the intercom station may also be provided with a button for contacting the operator of the control system directly.

Thus, the present disclosure discloses various effective methods for providing remote access to residential or office building. Employment of such methods may eliminate the need to hire doormen or security guard. Below is provided a simplified summary of one or more aspects regarding these methods in order to provide a basic understanding of such aspects as a prelude to the more detailed description that is presented later.

According to an aspect, there is provided a computer-implemented method for providing remote access control to a building. An example method may comprise: receiving a call signal of an intercom station, the call signal comprising a resident identifier (ID) which indicates a resident with whom a visitor is trying to communicate, receiving a video stream generated by at least one camera, the video stream comprising one or more images of the visitor, retrieving visitor data associated with the resident ID, the visitor data comprising one or more visitor profiles, and providing access to the building for the visitor based upon one or more predetermined criteria.

According to one or more embodiments, the method may further comprise forwarding the call signal from the intercom station to a mobile device of the resident. The call signal of the intercom station can be received when a predetermined period of time is elapsed after a corresponding call signal is initiated by the visitor at the intercom station.

According to one or more embodiments, the method may further comprise retrieving a resident profile associated with the resident ID, the resident profile comprising one or more of the following: a resident address, a resident location, a resident name, resident contact information, and a resident photo. The visitor profile may comprise one or more of the following: a visitor name, a visitor title, a visitor profile, a visitor security code, a secret question and a corresponding answer associated with the visitor, visitor contact information, information regarding time when the visitor may access the building, information about one or more reasons why the visitor may access the building, and visitor biometric data.

According to one or more embodiments, the method may further comprise establishing a call to a mobile device of the visitor. The method may further comprise establishing a call to a mobile device of the resident.

According to one or more embodiments, the method may further comprise enabling an operator to search information about the visitor among the one or more visitor profiles.

According to one or more embodiments, the one or more predetermined criteria may comprise successful identification of the visitor. The one or more predetermined criteria may comprise successful identification that the at least one camera provides real-time streaming video of the visitor at his or her current location. The one or more predetermined criteria may also comprise successful identification that the resident is outside of the building. The one or more predetermined criteria may also comprise successful authentication of the visitor based upon visitor biometric data.

According to one or more embodiments, the method may further comprise triggering one or more actuators to lock/unlock or open/close one or more doors of the building, which doors are within the vision of the at least one video camera. The method may further comprise triggering a first actuator to lock/unlock or open/close a first door and a second actuator to lock/unlock or open/close a second door, wherein when the first actuator is triggered to open the first door, the second actuator keeps the second door closed, and wherein when the second actuator is triggered to open the second door, the first actuator keeps the first door closed.

According to one or more embodiments, the method may further comprise forwarding the video stream generated by the at least one camera to the mobile device of the resident.

According to one or more embodiments, the method may further comprise enabling the resident to provide access to the building for the visitor via the mobile device.

According to one or more embodiments, the method may further comprise enabling the resident to trigger, via the mobile device, one or more actuators to lock/unlock or open/close one or more doors of the building.

According to one or more embodiments, the method may further comprise receiving the visitor data from the mobile device of the resident and storing the visitor data at one or more storages.

In further examples, the above methods steps are stored on a non-transitory machine-readable medium comprising instructions, which when implemented by one or more processors perform the steps. In yet further examples, subsystems or devices can be adapted to perform the recited steps. Other features, examples, and embodiments are described below.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium.

The embodiments described herein relate to computer-implemented methods and systems for providing remote access control to residential or office buildings. With this technology, a resident of a particular apartment of multi-apartment building or a resident of an office building can perform visitor management, i.e. to choose those visitors who can be granted access to the apartment or office when the resident is not able to communicate with the visitor via an intercom system, for example, when the resident is busy or out of the apartment or office. This allows the resident to mind his/her own business, without being bothered by that a desired visitor (or visitors) can not come into the building. Such permitted visitors can be, for example, clean workers, repair workers, couriers, deliverymen, messengers, and simply resident's family members, friends, and other guests.

Those skilled in the art would understand that the described technology can be used in various types of non-doorman buildings, such as private houses, cottages, offices, multi-family residential building, and so forth. As used hereinafter, the term "resident" relates to a person in possession of real property by any right or title. For simplicity, the residents or tenants mentioned herein are people living in the above-stated residential buildings or working in the above-stated office buildings.

Figure 1:
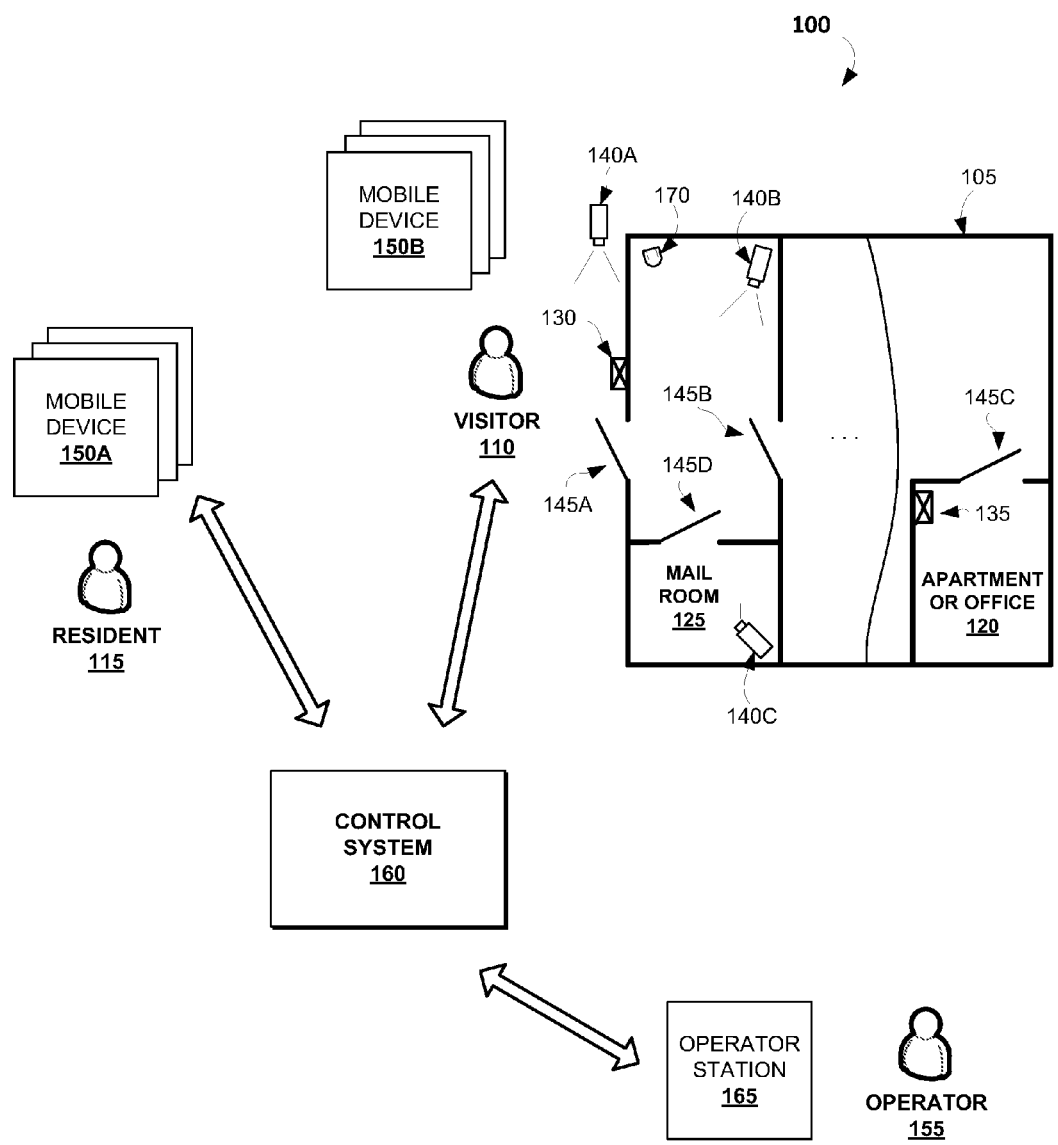
FIG. 1 illustrates an example environment suitable for implementing methods for remote access control to a building.

Referring now to the drawings, FIG. 1 illustrates an example environment 100 suitable for implementing methods for remote access control to a building. As shown in the figure, there is a building 105, such as a multi-apartment building, which a visitor 110 wants to access. In particular, the visitor 110 is a guest of a resident 115 of an apartment 120. In this case, the visitor 110 may want to access the apartment 120. In another example, the visitor 110 is a deliveryman willing to access a mail room 125 to leave a letter, package, parcel, or the like.

Figure 2:
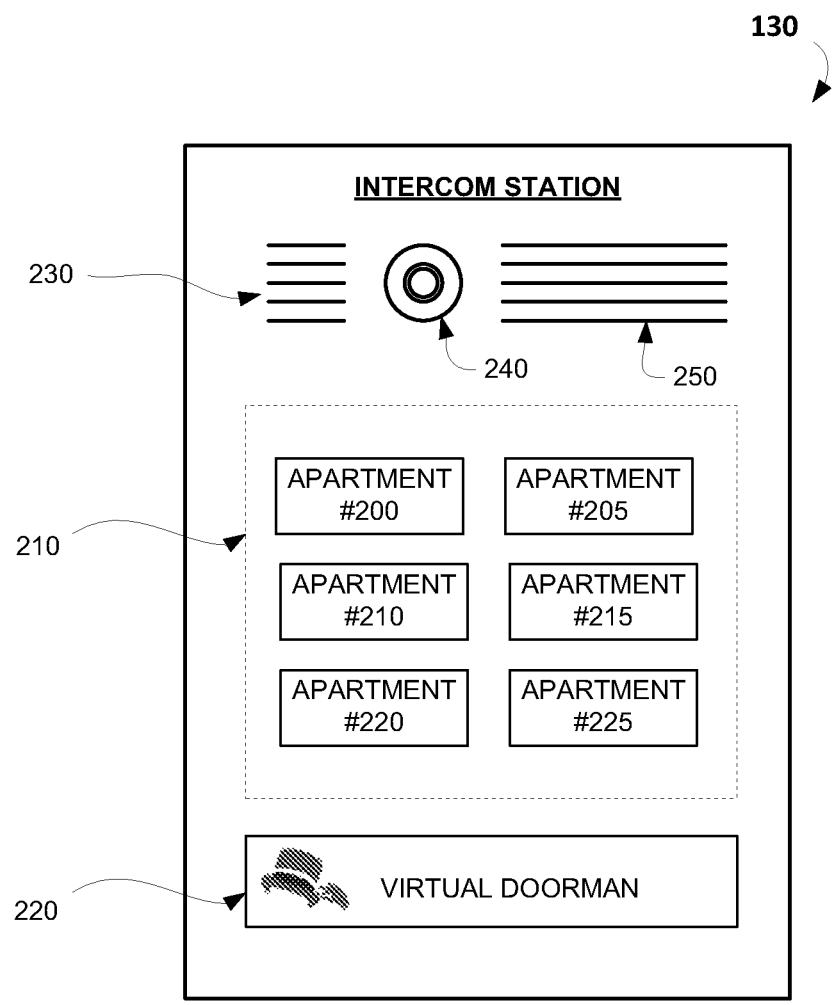
FIG. 2 illustrates an example interface of an intercom station.

When the visitor 110 comes to the building, he or she may use an intercom station 130 to call the resident 115. In this case, the visitor 110 may press a corresponding button on a keypad or graphical interface (i.e., when a touchscreen is used) associated with an apartment number or resident name. More specifically, as shown in FIG. 2, which illustrates an example interface of the intercom station 130, the visitor press one of buttons 210 to call a particular resident 115. In one embodiment, the call initiated by the visitor 110 via the intercom station 130 is directed to a communication device 135 located at the apartment 120. The communication device 135 is further described below with reference to FIG. 3.

If the resident 115 is located at his or her apartment 120, the resident may answer the call with the aid of the communication device 135 and speak to the visitor 110 located near the entrance to the building 105. In certain embodiments, the resident 115 may also watch streaming video captured by one or more of video cameras, such as by a video camera 140A located in front of the intercom station 130 or nearby the entrance to the building 105, via a display 310 of the communication device 135. If the resident 115 identifies the visitor 110, the resident 115 may trigger one or more actuators (not shown), with the help of the communication device 135, to open one or more doors 145A-145C to provide access for the visitor to the building 105 and optionally to the apartment 120.

With continuing reference to FIG. 1, in an embodiment, when the resident 115 is not located at the apartment 120 or has no availability or wiliness to use the communication device 135, the call initiated by the visitor 110 via the intercom station 130 may be forwarded to one or more mobile devices 150A of the resident 115. For example, the call may be initially forwarded to the communication device 135, but if it is not answered, the call may be forwarded to the mobile device 150A after expiration of a predetermined period of time (e.g., 20 seconds). In an example embodiment, the resident 115 may program the communication device 135 so that any calls are forwarded to the mobile device 150A right after they are initiated. In an example, the apartment 120 may lack the communication device 135, and in this case, similarly, all calls may be forwarded to the mobile device 150A right after they are initiated.

The mobile device 150A may refer to a cellular phone, smart phone, computer (e.g., a desktop computer, laptop computer, and tablet computer), Personal Digital Assistant (PDA), or any other wired or wireless electronic device. The resident 115 may use the mobile device 150A to speak to the visitor 110, watch streaming video generated by one or more video cameras, such as the video camera 140A, and control the one or more actuators (not shown) to open/close the one or more doors 145A-145C to provide access to the building 105 and optionally to the apartment 135 or the mail room 125.

With continuing reference to FIG. 1, in another embodiment, when the resident 115 is not located at the apartment 120 or has no availability or wiliness to use the communication device 135, the call initiated by the visitor 110 may be forwarded to an operator 155 of a control system 160. The operator 155 may use an operator station 165 (e.g., a computer) operatively coupled or embedded with the control system 160 to speak to the visitor 110, watch streaming video generated by one or more video cameras, such as the video camera 140A, and control the one or more actuators (not shown) to open/close the one or more doors 145A-145C to provide access to the building 105 and optionally to the apartment 120 or the mail room 125. The control system 160 may also communicate data, voice, and video streams to the operator station 165, the mobile device 150A of the resident 115 and/or one or more mobile devices 150B of the visitor 110. The mobile device 150B may refer to a cellular phone, mobile phone, smart phone, tablet computer, PDA, or any other portable wireless electronic device. As will be described below with greater details, the control system 160 may facilitate the way how a decision whether the visitor 110 may enter the building or not is made. In certain embodiments, this decision can be made automatically (or in a semi-automatic manner) based upon one or more predetermined criteria and data obtained from one or more of the following: the intercom station 130, the resident mobile device 150A, the visitor mobile device 150B, the one or more video cameras, such as the video camera 140A, and an input of the operator 155 or resident 115. The control system 160 may also trigger one or more actuators (not shown) to open or unlock the one or more doors 145A-145C, maintain a database with visitor and resident profiles, employ automatic security algorithms, such as calling police or emergency, and so forth.

According to an example embodiment, the visitor 110 may be a deliveryman having a letter, parcel, or package for a resident 115. In this case, the deliveryman may wish to leave the letter, parcel, or package in the mail room 125. To access the building 105, the visitor 110 may press "Virtual Doorman" button 220 of the intercom station 130 as shown in FIG. 2. In this case, the communication link is established between the visitor 110 and the operator 155. The operator 155 may speak to the visitor 155 and watch one or more streaming videos from the one or more video cameras such as the video camera 140A. If the operator 155 identifies the visitor 110 as a deliveryman, the operator may trigger one or more actuators (not shown) to open/close the front door 145A and/or the door 145D to the mail room 125. For security reasons, the operator 155 may be enabled to trigger only those actuators to open the doors which are under the current vision of a respective video camera. In other words, the operator may open only those doors that are currently observable via the streaming video. This approach eliminates possible operator's mistakes.

Furthermore, for security reasons, once the front door 145A is triggered to be opened, the doors 145B and 145D, which are in proximity to the front door 145A, are kept closed. The door 145D to the mail room 125 can be opened only when the front door 145A is closed. Similarly, when the visitor 110 being a guest of the resident 115 enters through the front door 145A, the door 145B is kept closed. The door 145B can be opened, when the front door 145A is closed. Furthermore, the door 145B can be opened only when a corresponding video stream generated by a camera 140B adjusted to capture images of the door 145B is currently forwarded to the operator 155 and is currently on the operator's display screen.

Furthermore, once the deliveryman enters the mail room, the deliveryman can make a photo or scan the parcels, letters or packages he or she leaves in the mail room 125. Accordingly, the mail room 125 may be equipped with a camera 140C and/or a scanner (not shown) to make pictures of the incoming mail labels or tags. The captured images are then transmitted to the control system 160 for further processing.

In result, a corresponding log entry can be created and stored in storage of the control system 160. Moreover, a corresponding message can be sent to the mobile device 150A of a particular resident 115. It should be also noted that the mail room 125 and/or one or more premises of the building 105 may be also equipped with speakers (not shown) so as the operator 155 may guide the visitors 110 by giving voice instructions or comments.

With continuing reference to FIG. 1, the building can be equipped with one or more sensors 170. Each sensor 170 may refer to a security sensor, motion detector, fire detectors, water leak detector, gas presence detector, touch detector, proximity detector, and so forth. The one or more sensors 170 can be located in one or more of rooms, apartments, offices, mail rooms, common areas, and, in general, anywhere inside or outside of the building 105. The one or more sensors 170 can be also operatively coupled to the control system 160 so that the building 105 may be under control. In an example, in case a proximity detector and/or motion detector senses that a visitor 110 stands near the front door 145A during a predetermined period of time (e.g., more than 30 seconds), a warning signal can be generated and sent to the control system 160 for the attention of the operator 160 and/or the resident 115. Similarly, in case of fire, water or gas leakage, invasion, break, rubbery, any kind of damage, etc., a corresponding warning signal can be generated by one or more sensors 170 and sent to the control system 160 for the attention of the operator 160 and/or the resident 115.

According to various embodiments, one or more devices related to the environment 100 and described above may be operatively coupled to one or more security systems (not shown), guard systems, and so forth. Alternatively, the control system 160 may serve as or employ functionality of a security system that may generate and transmit warning signals to the police, emergency, fire department, maintenance service, and other services or agencies depending on an application.

Although, there is shown only one building 105 and one apartment 120, it should be also understood the building may include many apartments and/or offices 120. Furthermore, the control system 160 may serve a plurality of buildings 105 and/or a plurality of apartments/offices 120.

With reference now to FIG. 2, as mentioned, there is shown an example interface of the intercom station 130. The term "intercom station", as used herein, refers to a stand-alone voice communications system for use within a building or small collection of buildings. The interface of the intercom station 130 may include a keypad or touchscreen display with one or more buttons 210 to call one or more residents 115. The keypad or touchscreen display may also include "Virtual Doorman" button 220 enabling a visitor 110 to contact an operator 155 of the control system 160 in case a particular resident 115 can not speak to the visitor 110 or there is no necessity to speak to any of the residents (e.g., when the visitor 110 is a deliveryman or maintenance worker, etc.). The interface of intercom station 130 may further include a microphone 230 for capturing visitor's voice, a video camera 240 for capturing images of the intercom station surroundings, and a speaker 250 to generate audio messages such as operator or resident voice.

Figure 3:
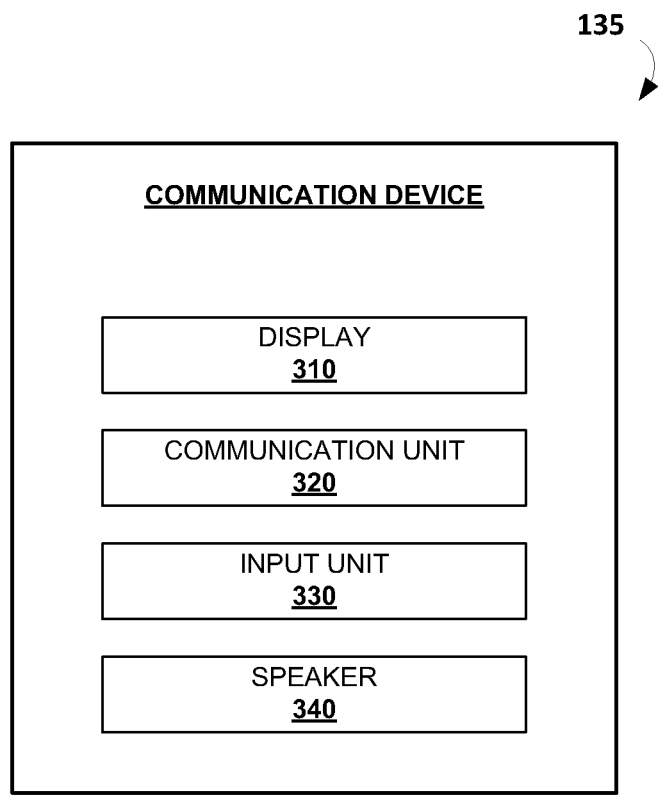
FIG. 3 shows an example embodiment of a communication device.

FIG. 3 shows an example embodiment of the communication device 135 which can be mounted in an apartment or office 120. As shown in the figure, the communication device 135 may comprise a display 310 which can be used to watch streaming video as captured by one or more video cameras 140A-140C, 240. The communication device 135 may also comprise a communication unit 320 configured to receive and transmit data to the intercom station 130 and/or the control system 160 and/or the mobile device 150A. The communication device 135 may also comprise an input unit 330 configured to receive various inputs of the resident 115. For example, the input may refer to a voice of the resident 115 for further transmission to the visitor 115 or the operator 155. The communication device 135 may also comprise one or more speakers 340 to provide audio related to the voice of the visitor 110 or the operator 155.

Figure 4:
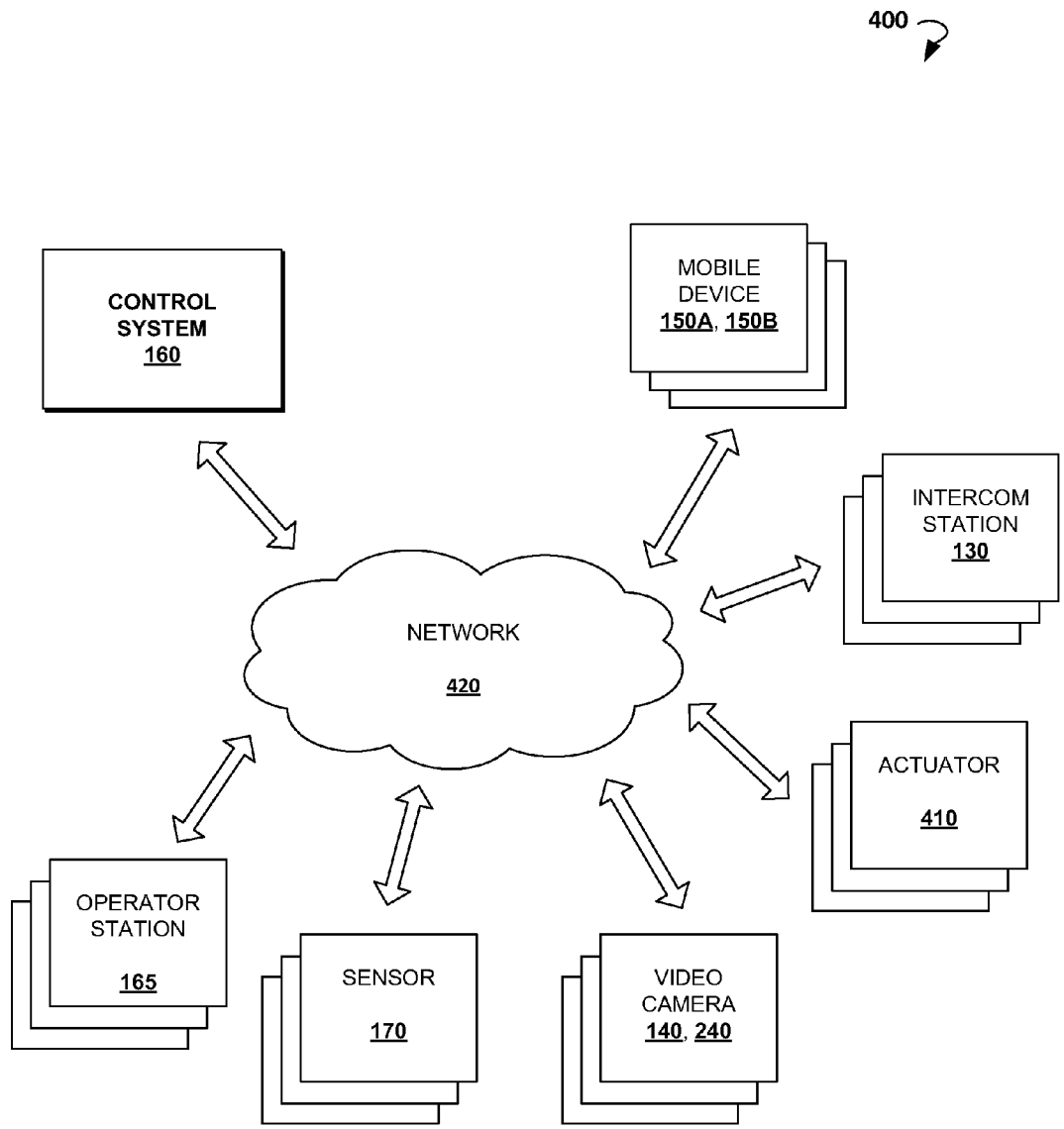
FIG. 4 shows an environment suitable for implementing methods for remote access control to a building according to an example embodiment.

FIG. 4 shows an environment 400 suitable for implementing methods for remote access control to the building 105 according to an example embodiment. As shown in this figure, there is provided one or more mobile devices 150, one or more intercom stations 130, one or more actuators 410, one or more video cameras 140, one or more sensors 170, a control system 160, one or more operator stations 165, and a network 420.

As mentioned, the mobile devices 150 may be in possession of the residents 115 and/or visitors 110. In general, the mobile devices 150 may refer to a mobile terminal, cellular phone, smart phone, PDA, computer (e.g., tablet computer, laptop computer, desktop computer), and so forth. The mobile devices 150 can be used by the visitors 110 to speak to residents 115 and/or operators 155. The mobile devices 150 can be used by the residents 115 to speak to visitors 110 and/or operators 155, download or upload information regarding the visitors 110, watch streaming video from the cameras 140, trigger one or more actuators 410, and so forth.

The intercom stations 130 may refer to a stand-alone voice communications system for use within a building 105 or small collection of buildings 105. The intercom stations 130 are configured to receive inputs, capture audio and video and transmit inputs and/or audio and video data to the control system 160 and optionally to the mobile devices 150. The intercom stations 130 are also configured to receive audio messages originated from the operator 155, a corresponding resident 115 or the control system 160 (e.g., automatic messages). An example interface of the intercom stations 130 is given in FIG. 2.

The one or more actuators 410 are configured to open/close or lock/unlock one or more doors 145A-145D of the building 105 based upon a command received from the control system 160 or one or more mobile devices 150A. The actuators 410 may refer to electrical motors, inductive based actuators, or electromagnetic actuators used for moving or controlling various types of mechanisms or systems, locking or unlocking doors, or opening/closing doors.

The video cameras 140, 240 are configured to capture streaming video in real time and transmit it to the control system 160 and optionally to the mobile devices 150A. The video cameras 140, 240 may be placed inside or outside a building. In an example embodiment, the video cameras 140, 240 are faced towards one or more doors 145A-145D.

The sensors 170 are configured to measure one or more parameters such as voltage, current, inductivity, resistance, conductivity, capacitance, humidity, temperature, light transmittance, and so forth. In general, the sensors 170 may refer to motion detectors, fire detectors, water leak detectors, gas presence detectors, touch detectors, proximity detectors, security detectors, and so forth. The one or more sensors 170 can be located in one or more of rooms, apartments, offices, mail rooms, common areas, and, in general, anywhere inside or outside of the building 105. The one or more sensors 170 can be also operatively coupled to the control system 160 and optionally to the mobile device 150B.

The control system 160 can be configured to implement methods for providing remote access control to one or more buildings 105. The control system 160 will be further described in greater details with reference to FIG. 5.

The one or more operator stations 165 can be used by operators 155 to manage the control system, grant or restrict access to various buildings or premises, communicate with visitors and residents, and so forth. In general, operator stations 165 may refer to computers, servers, or similar devices.

The network 420 can be a wireless or wire network, or a combination thereof, configured to operatively couple the above mentioned modules, devices and systems as shown in FIG. 4. For example, the network 420 may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, dial-up port such as a V.90, V.34 or V.34b is analog modem connection, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection, mesh or Digi® networking.

Figure 5:
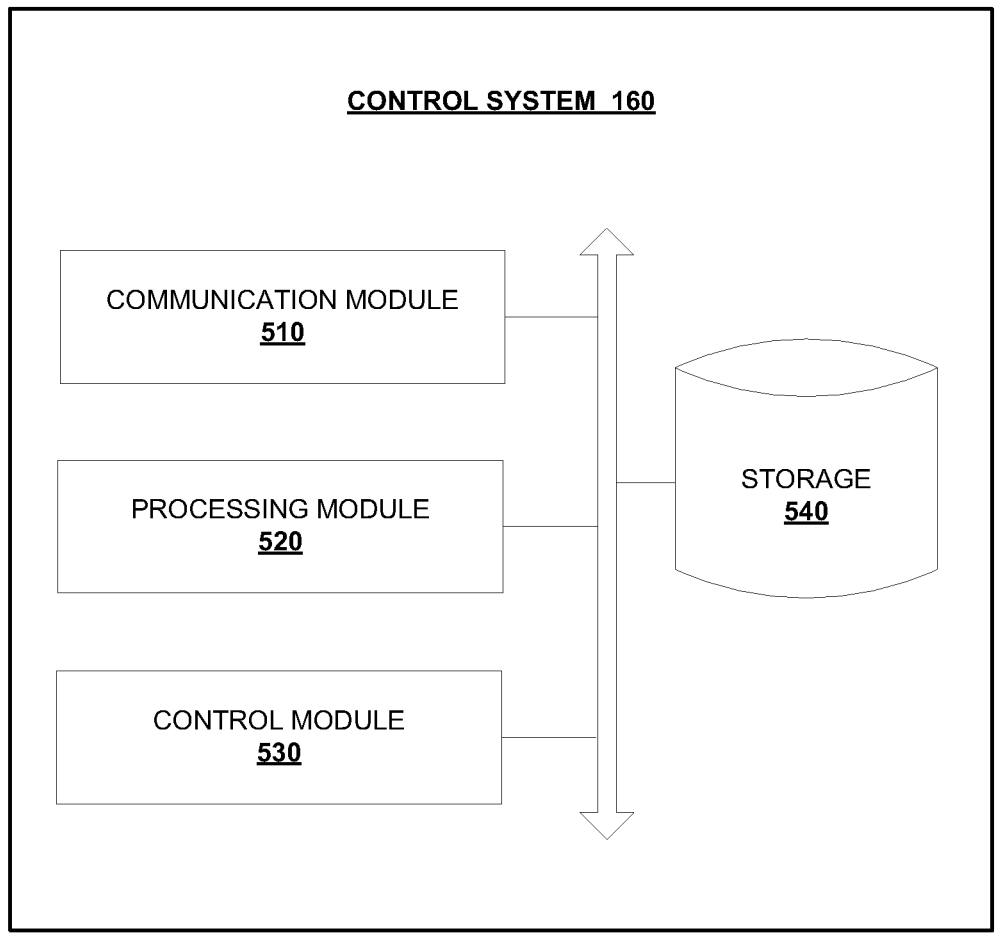
FIG. 5 shows an example control system suitable for implementing methods for providing remote access control to one or more buildings.

FIG. 5 shows an example control system 160 suitable for implementing methods for providing remote access control to one or more buildings. The control system 160 may be resided at one or more servers, such as one or more web servers, one or more computers, and may comprise multiple software implemented modules. In the shown embodiment, the control system 160 may include, embed, or be coupled to a communication module 510, processing module 520, control module 530, and storage 540. All of these modules 510-540 can be integrated within a single apparatus, or, alternatively, can be remotely located and optionally accessed via a third party. The control system 160 may further include additional modules, but the disclosure of such modules is omitted so as not to burden the entire description of the present teachings. It will be appreciated by one of ordinary skill in the art that examples of the foregoing modules may be virtual, and instructions to be executed by the modules may in fact be retrieved and executed by a processor.

In general, the communication module 510 is configured to enable communication between the control system 160 including its modules 520-540 and one or more mobile devices 150, one or more intercom stations 130, one or more actuators 410, one or more video cameras 140, one or more sensors 170, and one or more operator stations 165. More specifically, the communication module 510 is configured to receive call signals originated from one or more intercom stations 130. It should be mentioned that these call signals may comprise resident IDs which indicate particular residents 115 with whom visitors 110 is trying to communicate. In other words, each button 210 of the intercom station interface is associated with a certain resident 115 and corresponding resident ID. In an embodiment, when a visitor 110 presses "Virtual Doorman" button 220, a call signal is also generated and sent to the control system 160 and further to an operator stations 165, however such control signal may not comprise resident ID, but it may comprise data that the visitor is willing to speak to the operator 155.

The communication module 510 is also configured to receive a video stream generated by at least one camera 140. The video stream may be transmitted on a constant basis, or may be transmitted once a visitor 110 calls a resident or operator, or when the one or more sensors 170 are activated. The streaming video may be presented for the operator 155 via a display or similar device. Moreover, the streaming video may be stored in the storage 540.

The communication module 510 is also configured to receive data as measured by the one or more sensors 170. The data measured by the one or more sensors 170 may be stored in the storage 540 and/or presented to the operator 155 via a display screen of operator stations 165.

The communication module 510 is further configured to send control signals to the one or more actuators 410 to open/close or lock/unlock a particular door 145A-145D. The control signals to manipulate one or more doors may be generated by the operator 155 via the control system 160 and a corresponding operator control device (not shown), via the one or more mobile devices 150A being in possession of the residents 115, or automatically by the control system 160 based upon on predetermined criteria.

The processing module 520 is configured to retrieve visitor data associated with resident IDs and/or retrieve resident data, and present this information to the operator 155 and/or the residents 115. In an example embodiment, when a visitor 110 presses a button 210 of the intercom station 130 to call a particular resident 115, the processing module 520 automatically retrieves visitor data, which includes one or more visitor profiles, or resident data, which similarly includes one or more resident profiles. The visitor profiles and resident profiles are discussed below with reference to FIGS. 11 and 12, accordingly. In general, the visitor profiles and/or resident profiles may comprise names, photos, contact information, biometric data, security information, and so forth. The processing module 520 can be also configured to enable the operator 155 or facilitate or automatically perform searching of information about the visitor 110 among the one or more visitor profiles. The processing module 520 can be also configured to enable the operator 155 to perform searching of information about the resident 115 among the one or more resident profiles (although this operation can be performed automatically). In other words, the information regarding the visitors 110 and residents 115 may be processed so that it is delivered properly and in timely manner.

Furthermore, the processing module 520 can be configured to make one or more calls, redirect calls, transmit and retransmit data such as streaming video, control signals to actuate one or more actuators 410, and so forth. For example, the processing module 520 may forward the call signal originated from the intercom station 130 to a particular mobile device 150A of corresponding resident 115. The processing module 520 may also forward the video stream generated by the at least one camera 140A-140C to a particular mobile device 150A of corresponding resident 115, when requested. The processing module 520 may also establish a call to a mobile device 150B of the visitor 110 (this procedure can be used to make sure that the visitor 110 standing near the building and calling a particular resident 115 is the same person as provided in a corresponding visitor profile). The processing module 520 may also establish a call to the mobile device 150A of the resident 110 (this procedure can be performed by the operator 155 in case of emergency or when there is no visitor profile for a person calling the resident 115 via the intercom station 130).

Furthermore, the processing module 520 can be configured to enabling the resident 115 to provide access to the building 105 and/or the mail room 125 and/or the apartment 120 for the visitor 110 via the mobile device 150A. The processing module 520 can be also configured to enable the resident 115 to trigger, via the mobile device 150A, one or more actuators 410 to lock/unlock or open/close one or more doors 145A-145D of the building 105.

With continuing reference to FIG. 5, the control module 530 is configured to enable the operator 155 to provide access to the building 105 and/or the mail room 125 and/or the apartment 120 for the visitor 110 based upon one or more predetermined criteria. The access can be provided by triggering one or more actuators 410, such as electromagnetic actuators, to unlock and/or open one or more doors 145A-145D. According to various embodiments, when the front door 145A is unlocked by the operator 155, resident 115 or control system 160 to allow the visitor 110 entering the building 105, all or some of remaining doors, such as doors 145B and 145D, are kept locked. Once the visitor 110 is entered the building 105 and the front door 145A is closed and locked, the operator 155, resident 115 or control system 160 may now open another door 145B or 145D. In other words, a first door 145 can be opened only when other doors 145 being in proximity to the first door 145 are closed and locked. Moreover, only those doors 145 can be opened, which are currently under supervision of the operator 155 or guard. In other words, the operator 155 may remotely unlock a door 145 when the operator is currently watching streaming video captured by a video camera 140, 240 located in proximity of this door 145 such that it is clearly observable for the operator 155 the door 145 and what a particular visitor 110 is doing. In general, these approaches improve security of the buildings 105 and may prevent invasions, robberies, and other illegal actions.

The access to the building 105 can be provided for a particular visitor 110 based on one or more predetermined criteria. In an example, one of criteria refers to successful identification of the visitor 110. The identification can be performed by the operator 155 by reviewing a corresponding visitor profile as downloaded from the storage 540, speaking to the visitor 110, watching streaming video captured by one or more video cameras 140A-140C, reviewing data as measured by one or more sensors 170, and so forth. The visitor profile may include a photo, and thus the operator may compare the photo and the visitor 110. The visitor profile may also include the visitor name, secret questions, passcode, notes of the resident 115 explaining possible reasons when the visitor 110 can be granted with access to the building 105 or apartments 120, contact details of the visitor 110, and other information or instructions of the resident 115 relative to the visitor 110. Therefore, the operator 155 may ask one or more questions to the visitor and then compare the visitor answers with information given in the corresponding visitor profile. For example, the operator 155 may compare the visitor name, the reason of visiting the building 105 or apartment 120, the resident name, ask answer to a secret question, verify a passcode, and so forth. In an embodiment, the operator 155 may also establish a call to a mobile device 150B of the visitor 110 to ensure that the visitor is the person as provided in the visitor profile. In yet another embodiment, the operator 155 may establish a call to a mobile device 150A of the resident 110 to ask questions regarding the visitor 110 and/or ask for further instructions. It should be also understood that if a visitor profile can not be found by the operator or there is no such profile, the visitor 110 can not be granted with access to the building 105.

The identification of the visitor 110 can be also performed by the resident 115. In general, in this case, the resident 115 uses his or her mobile device 150A to speak to the visitor 110, review a corresponding visitor profile as downloaded from the storage 540, watch streaming video captured by one or more video cameras 140A-140C, review data measured by one or more sensors 170, and so forth. Similarly, the resident 115 may ascertain that the visitor 110 is an expected visitor and he or she may enter the building 105 or the apartment 120. The resident 115 may provide access to the building for the visitor 110 by triggering one or more actuators 410.

The identification of the visitor 110 can be also performed with the help of the control system 160. Some or all functions can be automated. For example, the control system 160 may playback various audio messages for the visitor 110, ask him or her one or more questions, recognize the visitor's speech and provided answers, and compare them to information provided in the visitor profile. The control system 160 may also authenticate the visitor by acquiring and processing biometric data associated with the visitor 110. For example, the control system 160 may identify the user by face recognition, voice recognition, fingerprint recognition, retina/iris recognition, and so forth.

According to various embodiments, the predetermined criteria may also refer to successful identification that the at least one video camera 140A-140C provides real-time streaming video of the visitor 110 at his or her current location. As described above, the access to the building 105 and/or apartment 120 can be granted in case there is streaming video provided in real time to the control system 160 and/or the mobile device 150A, whereas the streaming video carries images of the visitor 110 and a door 145 which is about unlocked.

Furthermore, one of predetermined criteria may refer to successful identification that the resident 115 is currently outside of the building 105 or the apartment 120. In an example, the resident 115 may make an input to the mobile device 150A or the communication device 135 to indicate that he or she is not currently in the building 105 or the apartment 120 or will be outside in particular time and date. In an another example, it can be determined that the resident is probably outside of the building 105 or the apartment 120 if a call between the intercom station 130 and the communication device 135 lasts more than a predetermined period of time (e.g., after expiration of 30 seconds).

It should be understood by those skilled in the art that many other predetermined criteria can be established for identifying the visitors 110. For example, the visitors 110 may be required to input a password or personal identification code, permission of more than one resident 115 can be required to allow access to the building 105 and/or apartment 120, permission of both the operator 155 and a corresponding resident 115 can be required to allow access to the building 105 and/or apartment 120, identification that the visitor 110 uses/applies an access card, smart card, chip card, contactless smart card, key, and so forth.

With continuing reference to FIG. 5, the storage 540 is configured to store on or more resident profiles associated with one or more residents 115 of one or more apartments 120. Each resident profile may comprise one or more of the following: a resident address, apartment number, resident location, resident name, resident contact information (including phone numbers or e-mails), resident biometric data, one or more resident photos or videos, resident instructions to allow certain or all visitors.

The storage 540 is also configured to store on or more visitor profiles associated with one or more visitors 110. Each the visitor profile may comprise one or more of the following: a visitor name, visitor title, security code or personal identification number, secret question and corresponding answer, visitor contact information (including phone number), information regarding time when the visitor may access the building, information about one or more reasons why the visitor 115 may access the building 105, and visitor biometric data.

The storage 540 may also store various predetermined criteria, settings, parameters, audio data and video data (e.g., audio and video data captured by the cameras 140, 240 and/or microphone 230), and so forth.

Figure 6:
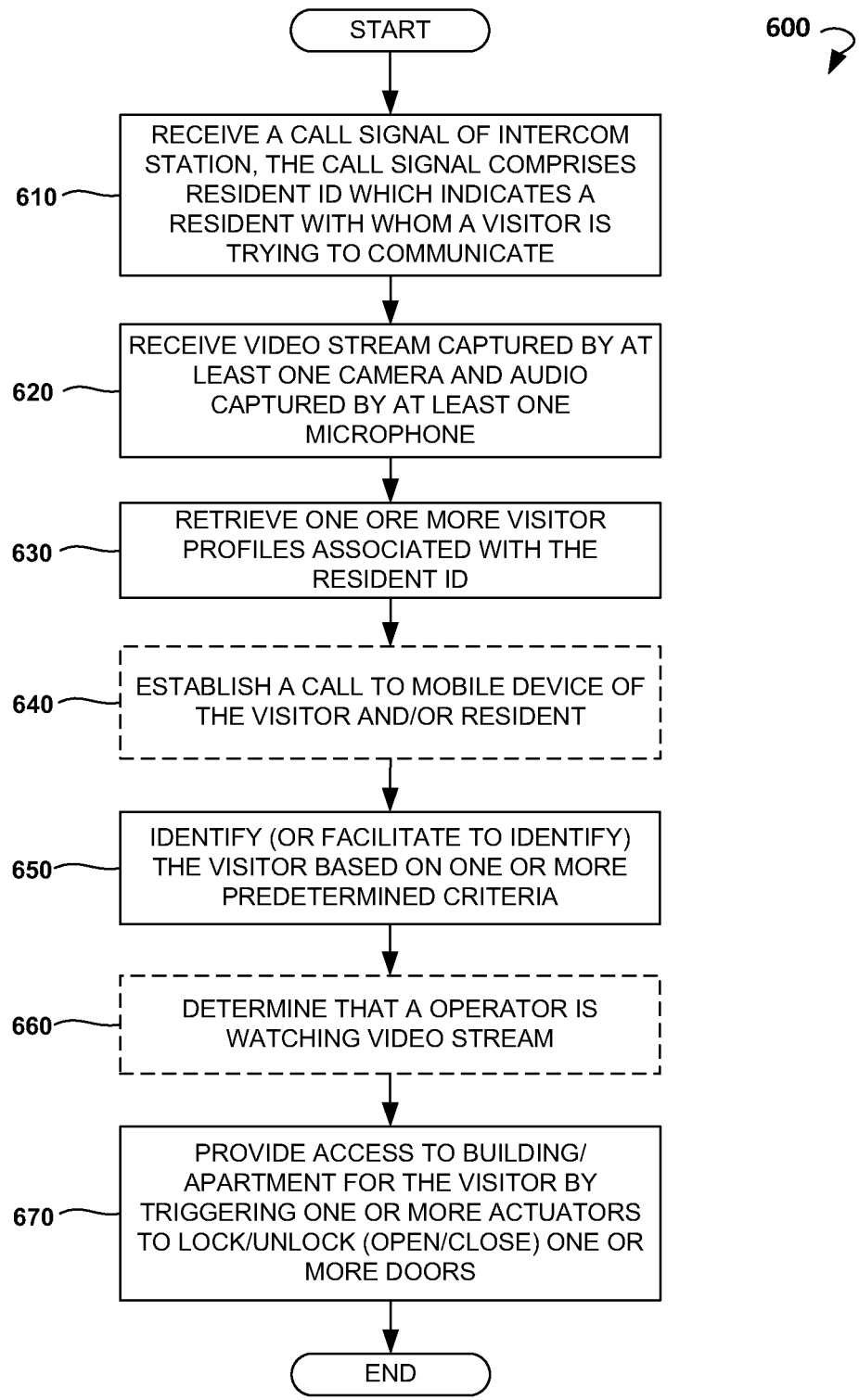
FIG. 6 is a process flow diagram showing a method for providing remote access control to a building or apartment according to an example embodiment.

FIG. 6 is a process flow diagram showing a method 600 for providing remote access control to a building 105 or apartment 120 according to an example embodiment. The method 600 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the control system 160. In other words, the method 600 can be performed by the modules discussed above with reference to FIG. 5. Each of these modules can comprise processing logic.

As shown in FIG. 6, the method 600 may commence at operation 610, with the communication module 510 receiving a call signal originated from an intercom station 130 when a visitor 110 wants to access a building 105 and a particular apartment 120 of resident 115. The call signal may comprise a resident ID which defines the resident 115 with whom the visitor 110 is trying to communicate. In various embodiments, the call signal may be received by the communication module 510 if the resident 115 has not answered the call via the communication device 135 after expiration of a predetermined period of time. In other words, if the resident 115 is not able to speak to the visitor 110, the call is forwarded to the operator 155 of the control system 160.

At operation 620, the communication module 510 receives a video stream generated by at least one camera 140, 240. The video stream shall comprise one or more images of the visitor 110. At the same operation, the communication module 510 receives audio captured by one or more microphones 230.

At operation 630, the processing module 520 retrieves visitor data associated with the resident ID. As mentioned, the visitor data includes one or more visitor profiles which include visitor names, visitor titles, security codes or personal identification numbers, secret questions and corresponding answers, visitor contact information (including phone numbers), information regarding times when the visitors may access the buildings, information about one or more reasons why the visitors may access the building/apartment, visitor biometric data, and so forth.

At operation 640, the processing module 520 may optionally establish a call to a mobile device 150B of the visitor 110 and/or a mobile device 150A of the resident 115. These calls may be helpful for verifying the visitor 110 and/or obtaining additional instructions of the resident 115.

At operation 650, the processing module 520 may optionally identify or facilitate to identify the visitor 110 based upon one or more predetermined criteria or settings. As mentioned, the visitor may be identified by the operator 155, by the resident 115 or by the control system 160 which may compare visitor answers to one or more questions, recognize face, recognize voice, and so forth.

At operation 660, the processing module 520 may optionally determine that the operator 155 is currently watching the video stream which includes one or more images of the visitor 110.

At operation 670, the control module 530 enables the operator to provide access to the building 105 and/or apartment 120 for the visitor 110. In certain embodiments, the control module 530 automatically provides access to the building 105 and/or apartment 120 for the visitor 110 based upon the one or more predetermined criteria. The access can be provided by triggering one or more actuators 410 to lock/unlock or open/close one or more doors 145A-145D of the building 105 and/or apartment 120. The doors 145A-145D shall be within the current vision of the at least one video camera 140, 240.

Figure 7:
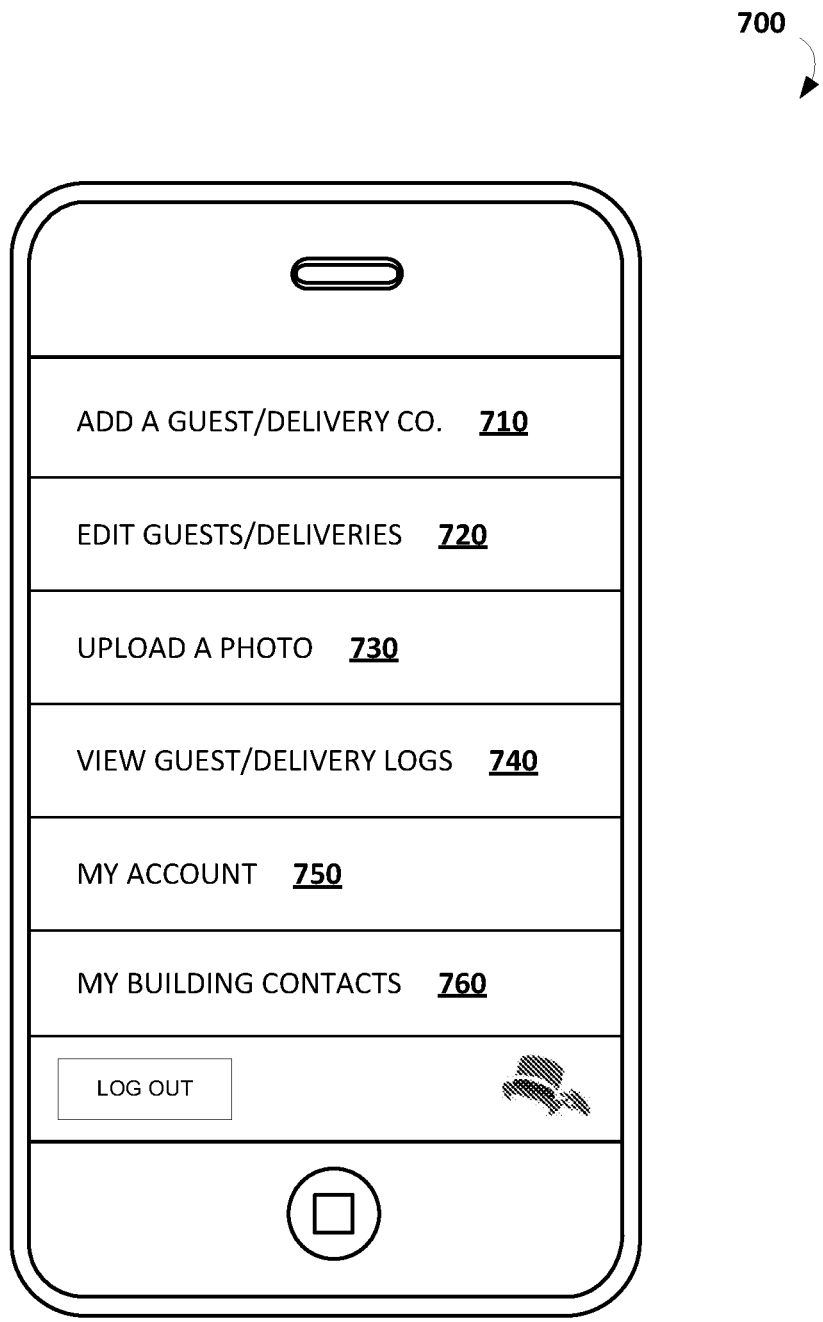
FIG. 7 is a simplified illustration of a graphical user interface displayable on a mobile device of resident, according to an example embodiment.

FIG. 7 is a simplified illustration of a graphical user interface 700 displayable on a mobile device 150A of resident 115, according to an example embodiment. The graphical user interface 700 may be represented as a window (e.g., a browser window) to show its content. As shown in FIG. 7, the graphical user interface 700 may comprise a clickable button 710 "Add a Guest/Delivery Co.". Once the resident 115 presses this button, the resident 115 will be prompted to input details of an expected visitor 110 such as a friend, family member, or deliveryman. The resident may upload photos, input names, contact information, instructions, and so forth.

The graphical user interface 700 may also comprise a clickable button 720 "Edit Guests/Deliveries" which enables the resident 115 to edit currently existing list of expected visitors 110. The graphical user interface 700 may also comprise a clickable button 730 "Upload a Photo" which enables the resident 115 to upload one or more photos of expected visitors 110. The graphical user interface 700 may also comprise a clickable button 740 "View Guest/Delivery Logs" which enables the resident 115 to view data including past events of visitors entrance and/or delivery of mail, packages, parcels, etc. The resident 115 may view time, date, visitor name, and other information associated with an event when the one or more visitors 110 were granted access to the building 105 and/or apartment 120.

The graphical user interface 700 may also comprise a clickable button 750 "My Account" which enables the resident 115 to view and edit settings associated with operation of the control system 160. The graphical user interface 700 may also comprise a clickable button 760 "My contacts" which may provide a list of contact data associated with the building management, operators, police and emergency services, etc.

Figure 8:
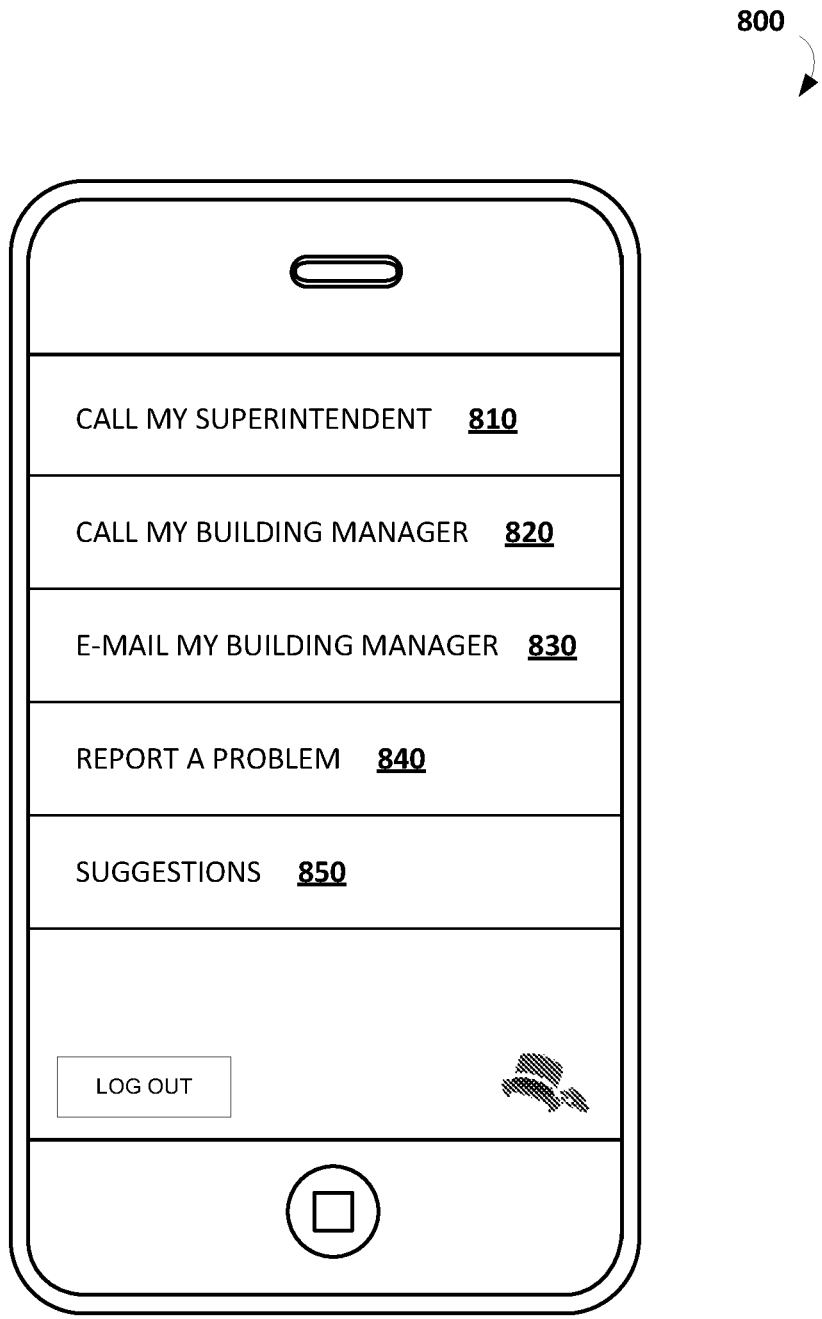
FIG. 8 is another simplified illustration of a graphical user interface displayable on a mobile device of resident, according to an example embodiment.

FIG. 8 is another simplified illustration of a graphical user interface 800 displayable on a mobile device 150A of resident 115, according to an example embodiment. The graphical user interface 800 may be represented as a window (e.g., a browser window) to show its content. As shown in FIG. 8, the graphical user interface 800 may comprise a clickable button 810 "Call My Superintendent" which may enable the resident 115 to call one or more superintendent or emergency services without a need to input a certain number. Similarly, there is a clickable button 820 "Call My Building Manager" which may enable the resident 115 to call a building manager without a need to input a certain number. There can be a clickable button 830 "Email My Building Manager" which may enable to write and send an email to the building manager or other responsible parties.

The graphical user interface 800 may also comprise a clickable button 840 "Report a Problem" which enables the resident 115 to write a text message for the attention of one or more responsible parties. For example, the resident 115 may report that one or more sensors 170 do not work, or that there is a water leakage, and so forth. The graphical user interface 800 may also comprise a clickable button 850 "Suggestions" which enables the resident 115 to write a text message with suggestions for the attention of one or more responsible parties.

Figure 9:
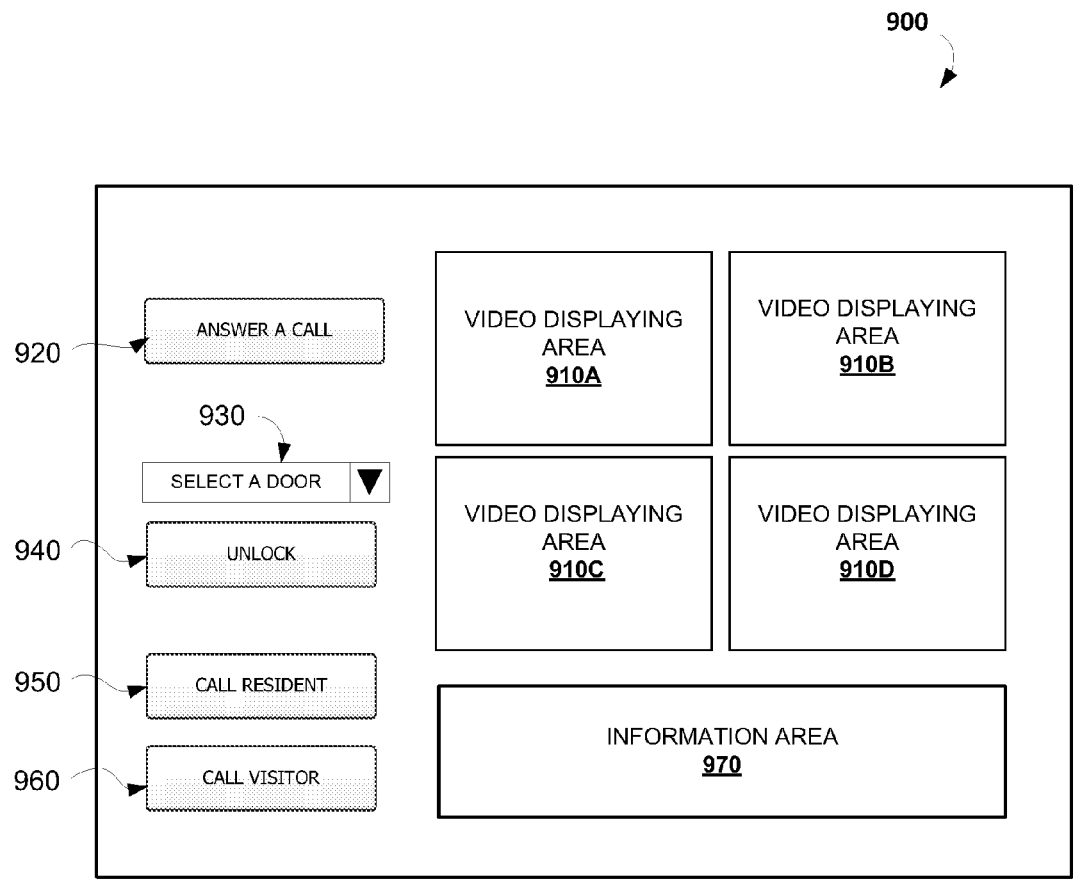
FIG. 9 illustrates an operator interface according to an exemplary embodiment.

FIG. 9 illustrates an operator interface 900 according to an exemplary embodiment. The graphical user interface 900 may be presented to an operator 155 on a display screen of the operator station 165 operatively coupled to the control system 160. As shown in the figure, the interface 900 includes one or more video displaying areas 910A-910D, a clickable button 920 "Answer", a menu 930 (such as a drop-down list, context menu, or the like), a clickable button 940 "Unlock", a clickable button 950 "Call Resident", a clickable button 960 "Call Visitor", and an information area 970.

In operation, when a call signal from the intercom station 135 is received by control system 160, a special sound occurs, which means that someone, namely the visitor 110, is trying to communicate with the resident 115 (who is not at his/her apartment 120) or operator 155. The operator 155 can answer this call by pressing the clickable button 920 "Answer", which may be considered as an equivalent to hanging up a telephone receiver.

The one or more video displaying areas 910A-910D are configured to display the video stream captured by one or more video cameras 140, 240. As stated above, the video stream is associated with the visitor. It should be also understood, that any applicable number of video displaying areas 910A-910D can be presented to the operator 155.

The information area 970 is configured to display information concerning the resident 115 and the one or more visitors 110. This information may include resident and visitors profiles which are automatically retrieved by the processing module 520 from the storage 540 responsive to the receipt of the call signal. Given such information, the operator 155 can determine whether the visitor 110 is a permitted person and, if so, provide the visitor with access to the building 105 and/or the mail room 125, and/or the apartment 120.

If the operator 155 needs to contact the resident 115 to acquire additional instructions or comments, the operator 155 may press the button 950 "Call Resident" to establish a call with the resident 115 or for forwarding the call originated from the intercom station 130 to the mobile device 150A of the resident 115. Similarly, the operator may want to call the visitor 110 to ensure that the person standing near the intercom station 130 possess the mobile device 150B and thus may be considered as an authorized visitor 110. Accordingly, when the operator presses the button 960 "Call Visitor", a call is established between the computer of operator 155 and the mobile device 150B of the visitor 110.

To grant access to the visitor 110, the operator may select a door 145, which he or she wants to open (unlock) for the visitor 110, from the menu 930, and then press the button 940 "Unlock" to unlock and/or open the selected door 145. When a particular door 145 is selected and the button 940 "Unlock" is pressed, the control system 160 triggers one or more particular actuators 410.

Figure 10:
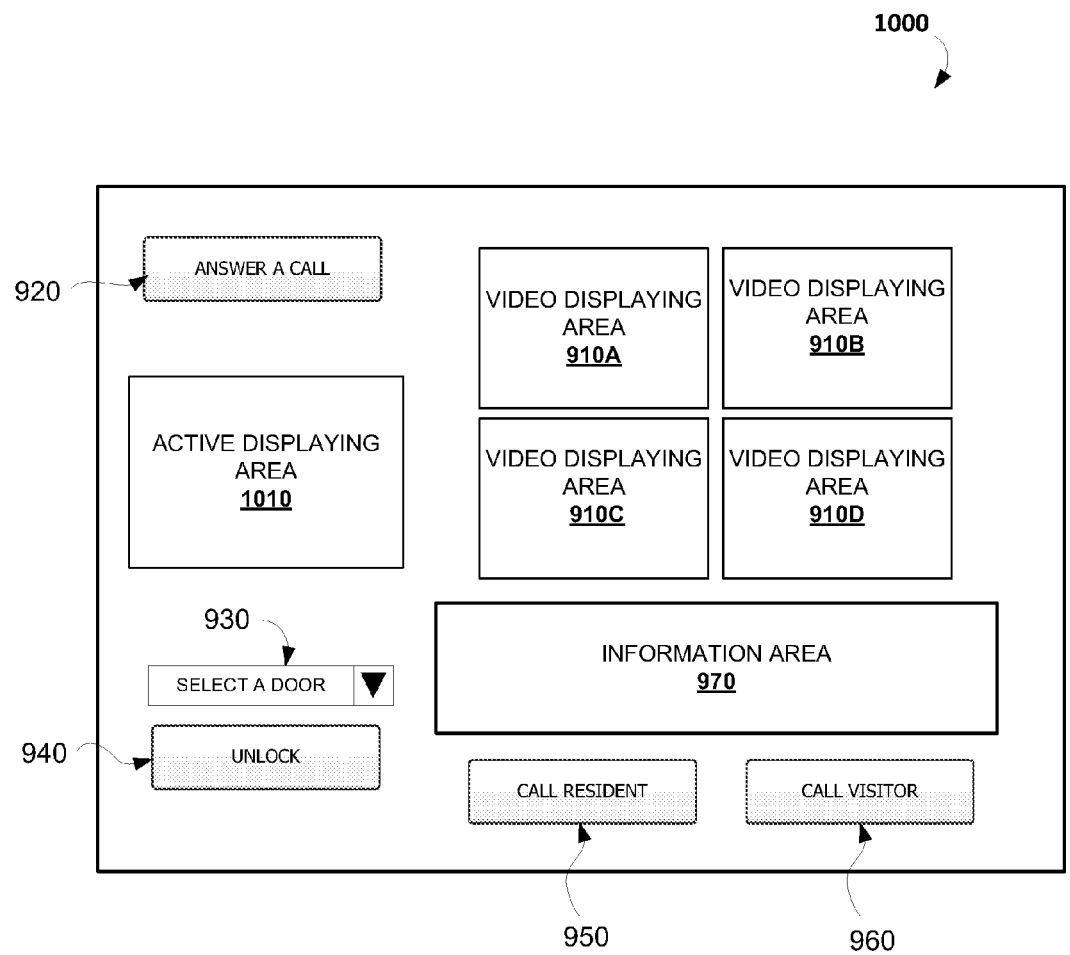
FIG. 10 illustrates another example of operator interface.

FIG. 10 illustrates another example of operator interface 1000 displayable on the operator station 165. As shown in the figure, the interface 1000 includes one or more video displaying areas 910A-910D, clickable button 920 "Answer", menu 930, clickable button 940 "Unlock", clickable button 950 "Call Resident", clickable button 960 "Call Visitor", information area 970, and also an active displaying area 1010.

In general, this embodiment is similar to the one shown in FIG. 9, however the interface 1000 has the active displaying area 1010. The active displaying area 1010 is configured for displaying a video stream associated with a visitor 110. According to one or more embodiments, the operator may unlock or open only those doors 145 that are currently displayed on the active displaying area 1010.

More specifically, in operation, a call signal of the intercom station 135 can be initiated by the visitor 110 willing to enter the building 105, which is then transmitted to the control system 160. The operator 155 can answer this call by pressing the clickable button 920 "Answer" and speak to the visitor 110, ask the visitor name, reason of visiting, and request to provide the passcode. The one or more video displaying areas 910A-910D display the video stream captured by one or more video cameras 140, 240. The operator 155 may also call the resident 115 by pressing the button 950 "Call Resident" or call the visitor 110 by pressing the button 960 "Call Visitor". The information area 970 displays information concerning the resident 115 and the one or more expected visitors 110. This information may include resident and visitors profiles which are automatically retrieved by the processing module 520 from the storage 540 responsive to the receipt of the call signal or which can be searched by the operator 155. Given such information, the operator 155 can determine whether the visitor 110 is a permitted person and, if so, provide the visitor with access to the building 105 and/or the mail room 125, and/or the apartment 120.

According to one or more embodiments, when the operator 155 needs to provide access to a particular authorized visitor 110 by unlocking a particular door 145, the operator 155 need to drag a particular video stream to the active displaying area 1010 or another way cause the active displaying area 1010 to display a particular video stream. If the video stream shown on the active displaying area 1010 is generated by a camera 140, 240 which is adjusted to capture the mentioned particular door 145, then the control system 160 may allow the operator 160 to open/unlock this door 145. In operation, once the video stream is dragged to the active displaying area 1010, the operator 155 may select a name of the door 145 from the menu 930 and then press the button 940 "Unlock". In the same manner, all other doors 145 can be opened or unlocked for the visitors 110 or residents 115.

It should be also understood by those skilled in the art that the interfaces 900 and 1000 may include additional widgets, clickable buttons, menus, etc. to provide additional functionality. For example, there can be buttons to select video streams from one or more video cameras 140, 240, place a call on hold, start or stop recording one or more video streams, make a snapshot image, start or stop recording audio, call police, call emergency, view maintenance notices, delivery logs, entry logs, search information, review, edit or update one or more visitor profiles, review, edit or update one or more resident profiles, view images and logs of deliveries (mails, packages, parcels), and so forth.

Figure 11:
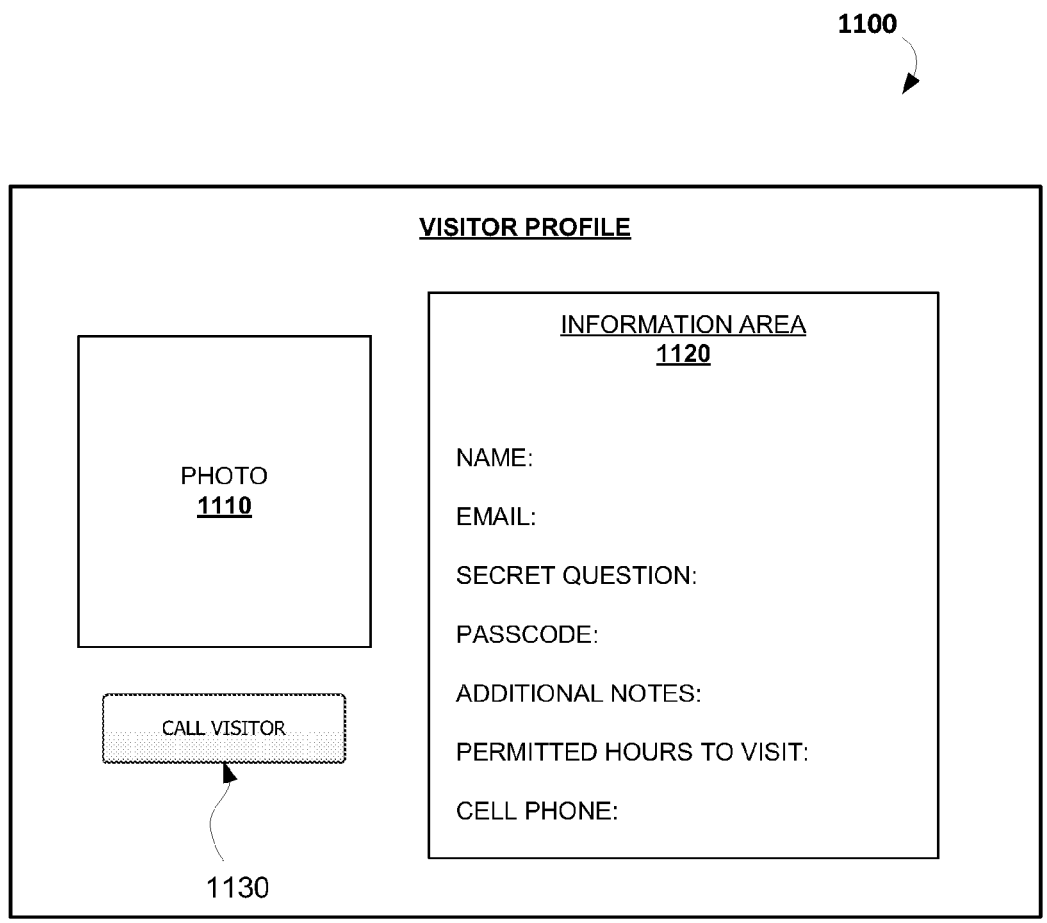
FIG. 11 shows an example graphical interface showing a visitor profile.

FIG. 11 shows an example graphical interface 1100 showing a visitor profile. The graphical interface 1100 can be shown on the operator station 165 of the operator 155 or mobile device 150A of a resident 115. By reviewing the visitor profile, the operator 155 or resident 115 can make a decision regarding whether a particular visitor 110 can be granted with access to the building 105, mail room 125, or apartment 120. In certain embodiments, the operator 155 or resident 115 may edit, create, upload, download, import, and export such visitor profiles.

In an example embodiment, the graphical interface 1100 is presented via a browser window. As shown in the figure, the graphical interface 1100 may include one or more photos 1110 of a particular visitor 110, an information area 1120, and a clickable button 1130 enabling to call the particular visitor 110. The information area 1120 may be populated, for example, with the following information: a visitor name, visitor title, visitor e-mail, visitor secret question and a corresponding answer, visitor contact information including phone numbers, and additional notes such as information regarding time when the visitor may access the building 105 or apartment 120, information about one or more reasons why the visitor 110 may access the building 105 or apartment 120, and so forth.

Figure 12:
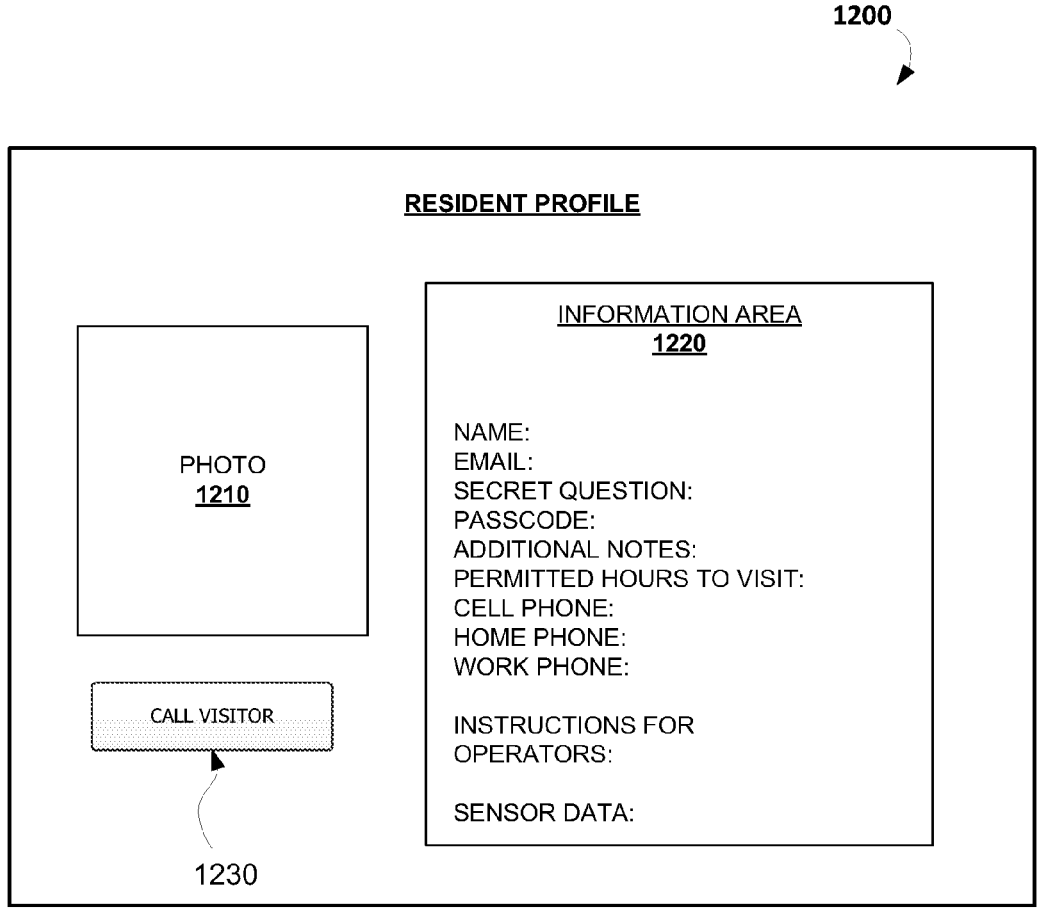
FIG. 12 shows an example graphical interface showing a resident profile.

FIG. 12 shows an example graphical interface 1200 showing a resident profile. The graphical interface 1200 can be shown on the operator station 165 or mobile device 150A of a resident 115. By reviewing the resident profile, the operator 155 can make a decision regarding whether a particular resident 115 can be granted with access to the building 105 or apartment 120, when, for example, the resident 115 forgot to take a key. In certain embodiments, the operator 155 or resident 115 may edit, create, upload, download, import, and export such visitor profiles.

In an example embodiment, the graphical interface 1200 is presented via a browser window. As shown in the figure, the graphical interface 1200 may include one or more photos 1210 of the resident 115, an information area 1220, and a clickable button 1230 enabling to call the resident 115. The information area 1220 may be populated, for example, with the following information: a resident name, resident street address, apartment number, resident e-mail, resident secret question and a corresponding answer, resident contact information including phone numbers, and additional notes such as instructions for granting access to one or more visitors 110 (e.g., time when one or more visitors may access the building 105 or apartment 120, information about one or more reasons why one or more visitors 110 may access the building 105 or apartment 120, and so forth), and also current data measured by one or more sensors 170.

Figure 13:
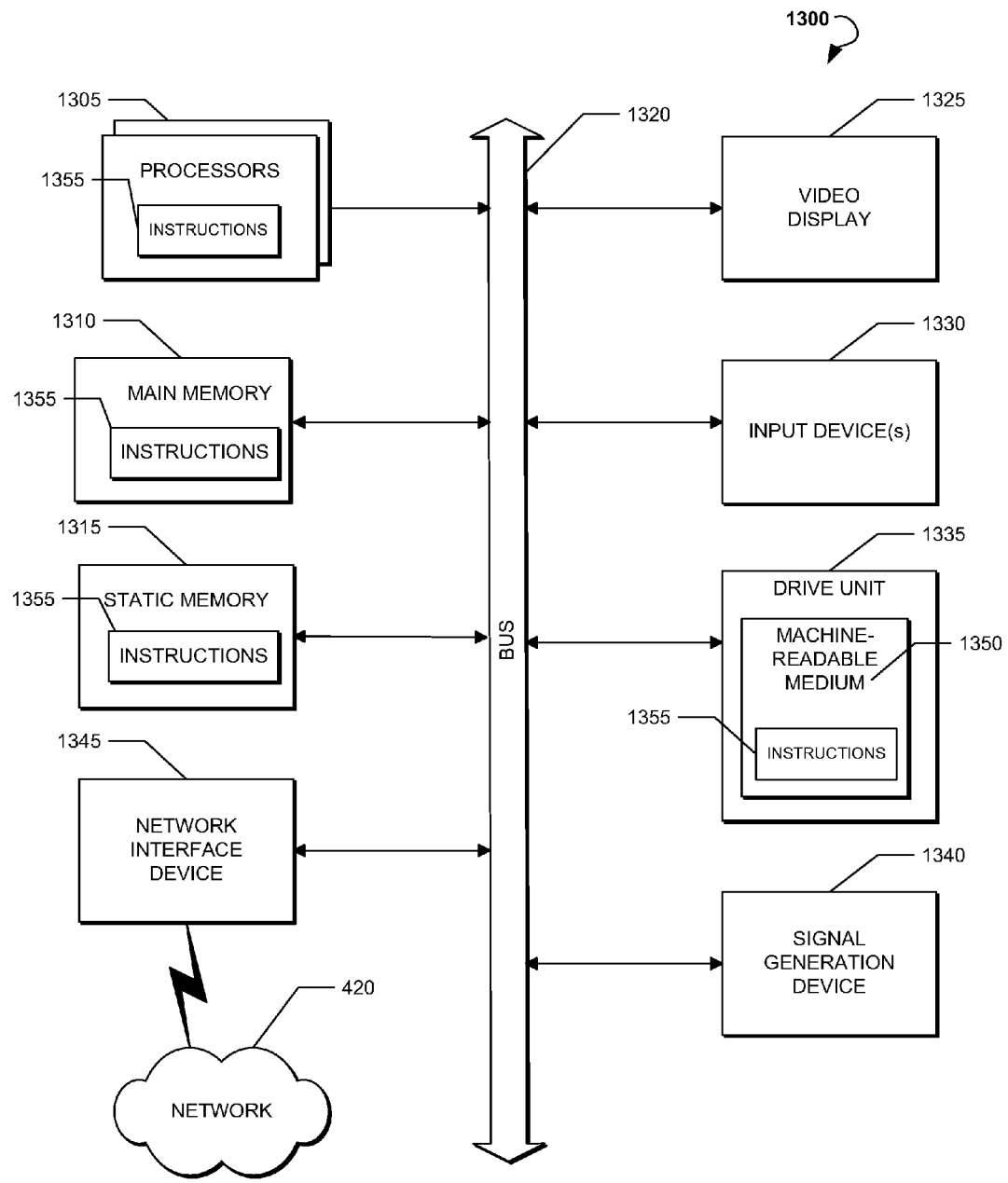
FIG. 13 illustrates a diagrammatic representation of a computing device for a machine in the example electronic form of a computer system, within which a set of instructions for causing the machine to perform any one or more of the techniques discussed herein can be executed.

FIG. 13 shows a diagrammatic representation of a computing device for a machine in the example electronic form of a computer system 1300, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, set-top box (STB), PDA, cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 1300 includes a processor or multiple processors 1305 (e.g., a central processing unit (CPU), a graphics processing unit (GPU), or both), and a main memory 1310 and a static memory 1315, which communicate with each other via a bus 1320. The computer system 1300 can further include a video display unit 1325 (e.g., a LCD or a cathode ray tube (CRT)). The computer system 1300 also includes at least one input device 1330, such as an alphanumeric input device (e.g., a keyboard), a cursor control device (e.g., a mouse), a microphone, a digital camera, a video camera, and so forth. The computer system 1300 also includes a disk drive unit 1335, a signal generation device 1340 (e.g., a speaker), and a network interface device 1345.

The disk drive unit 1335 includes a computer-readable medium 1350, which stores one or more sets of instructions and data structures (e.g., instructions 1355) embodying or utilized by any one or more of the methodologies or functions described herein. The instructions 1355 can also reside, completely or at least partially, within the main memory 1310 and/or within the processors 1305 during execution thereof by the computer system 1300. The main memory 1310 and the processors 1305 also constitute machine-readable media.

The instructions 1355 can further be transmitted or received over the communications network 420 via the network interface device 1345 utilizing any one of a number of well-known transfer protocols (e.g., Hyper Text Transfer Protocol (HTTP), CAN, Serial, and Modbus).

While the computer-readable medium 1350 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, methods and systems for providing remote access control to buildings or apartments are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for providing remote access control to a building, wherein the building includes a first door associated with a first room and a second door associated with a second room, the method comprising:
    maintaining a database with one or more visitor profiles and one or more resident profiles, wherein each visitor profile comprises a visitor name, information regarding time when the visitor is allowed to access the building, a secret question and a corresponding answer to the secret question, and information about one or more reasons why the visitor shall be granted access to the building;
    causing to display a graphical user interface on a mobile communication device of a resident of the building, wherein the graphical user interface enables the resident to add the one or more visitor profiles to the database, edit the one or more visitor profiles stored in the database, view data logs associated with past events of visitors entrance to the building, view data logs associated with mail delivery, and edit settings associated with a control system for providing remote access to the building;
    receiving a call signal from an intercom station, wherein the call signal is initiated by a visitor, the call signal comprises a resident identifier (ID) which indicates a resident with whom a visitor is attempting to communicate;
    receiving a first video stream generated by a first camera, wherein the first camera is associated with the first door or the intercom station;
    retrieving visitor data associated with the resident ID, the visitor data comprising one or more visitor profiles;
    directing the call signal to a communication device of the resident for establishing a communication session between the visitor and the resident, wherein the communication device is located inside the building;
    determining that the communication session between the visitor and the resident is not established within at least 20 seconds;

based on the determination, establishing a communication session between the intercom and the mobile communication device of the resident;

enabling the visitor to establish a communication session, via the intercom, between the visitor and an operator of the control system, when the resident is not available to speak with the visitor via the communication device or the mobile communication device; and providing access to the building for the visitor based upon one or more predetermined criteria, the visitor profile, and the resident profile.

2. The computer-implemented method of claim 1, further comprising retrieving a resident profile associated with the resident ID, the resident profile comprising a resident address, a resident name, resident contact information, a resident photo, and resident instructions regarding what visitors shall be granted with access to the building.

3. The computer-implemented method of claim 1, further comprising establishing a call to a mobile device of the visitor to ensure that the visitor is the same person as provided in the visitor profile.

4. The computer-implemented method of claim 1, further comprising causing to display a graphical user interface on a computer device of the operator of the control system, wherein the graphical user interface of the operator enables the operator to search information about the visitor among the one or more visitor profiles, view the one or more resident profiles, establish a communication session between the operator and the mobile communication device of the resident, view the first video stream generated by the first camera, view a second video stream generated by a second camera associated with the second door, and establish a communication session between the operator and the mobile communication device of the visitor, and remotely lock or unlock the first door.

5. The computer-implemented method of claim 1, wherein the one or more predetermined criteria comprising successful identification of the visitor.

6. The computer-implemented method of claim 1, wherein the one or more predetermined criteria comprising successful identification that the first camera provides real-time streaming video of the visitor at his or her current location.

7. The computer-implemented method of claim 1, wherein the one or more predetermined criteria comprising successful identification that the resident is outside of the building, and further comprising establishing a call to a mobile communication device of the resident.

8. The computer-implemented method of claim 1, wherein the one or more predetermined criteria comprising successful authentication of the visitor based upon visitor biometric data.

9. The computer-implemented method of claim 1, further comprising triggering the first actuator to lock/unlock or open/close the first door only when it is determined that the visitor is within the vision of the first video camera.

10. The computer-implemented method of claim 1, further comprising triggering the second actuator to lock/unlock or open/close the second door when it is determined that the visitor is within the vision of the second video camera.

11. The computer-implemented method of claim 1, further comprising forwarding the video stream generated by the first camera and the second camera to the mobile communication device of the resident.

12. The computer-implemented method of claim 1, further comprising enabling the resident to provide access to the building for the visitor via the mobile communication device.

13. The computer-implemented method of claim 1, further comprising enabling the resident to trigger, via the mobile communication device, one or more actuators to lock/unlock or open/close the first door and the second door.

14. A system for providing remote access control to a building, the system comprising:

a computing device including at least one processor and a memory storing processor-executable codes, which, when implemented by the at least one processor, cause to perform the steps of:

maintaining a database with one or more visitor profiles and one or more resident profiles, wherein each visitor profile comprises a visitor name, information regarding time when the visitor is allowed to access the building, a secret question and a corresponding answer to the secret question, and information about one or more reasons why the visitor shall be granted access to the building;

causing to display a graphical user interface on a mobile communication device of a resident of the building, wherein the graphical user interface enables the resident to add the one or more visitor profiles to the database, edit the one or more visitor profiles stored in the database, view data logs associated with past events of visitors entrance to the building, view data logs associated with mail delivery, and edit settings associated with a control system for providing remote access to the building;

receiving a call signal from an intercom station, wherein the call signal is initiated by a visitor, the call signal comprises a resident identifier (ID) which indicates a resident with whom a visitor is attempting to communicate;

receiving a first video stream generated by a first camera, wherein the first camera is associated with the first door or the intercom station;

retrieving visitor data associated with the resident ID, the visitor data comprising one or more visitor profiles;

directing the call signal to a communication device of the resident for establishing a communication session between the visitor and the resident, wherein the communication device is located inside the building;

determining that the communication session between the visitor and the resident is not established within at least 20 seconds;

based on the determination, establishing a communication session between the intercom and the mobile communication device of the resident;

enabling the visitor to establish a communication session, via the intercom, between the visitor and an operator of the control system, when the resident is not available to speak with the visitor via the communication device or the mobile communication device; and providing access to the building for the visitor based upon one or more predetermined criteria, the visitor profile, and the resident profile.

15. A non-transitory processor-readable medium having instructions stored thereon, which when executed by one or more processors, cause the one or more processors to implement a method for providing remote access control to a building, wherein the building includes a first door associated with a first room and a second door associated with a second room, the method comprising:

maintaining a database with one or more visitor profiles and one or more resident profiles, wherein each visitor profile comprises a visitor name, information regarding time when the visitor is allowed to access the building, a secret question and a corresponding answer to the secret question, and information about one or more reasons why the visitor shall be granted access to the building;

causing to display a graphical user interface on a mobile communication device of a resident of the building, wherein the graphical user interface enables the resident to add the one or more visitor profiles to the database, edit the one or more visitor profiles stored in the database, view data logs associated with past events of visitors entrance to the building, view data logs associated with mail delivery, and edit settings associated with a control system for providing remote access to the building;

receiving a call signal from an intercom station, wherein the call signal is initiated by a visitor, the call signal comprises a resident identifier (ID) which indicates a resident with whom a visitor is attempting to communicate;

receiving a first video stream generated by a first camera, wherein the first camera is associated with the first door or the intercom station;

retrieving visitor data associated with the resident ID, the visitor data comprising one or more visitor profiles;

directing the call signal to a communication device of the resident for establishing a communication session between the visitor and the resident, wherein the communication device is located inside the building;

determining that the communication session between the visitor and the resident is not established within at least 20 seconds;

based on the determination, establishing a communication session between the intercom and the mobile communication device of the resident;

enabling the visitor to establish a communication session, via the intercom, between the visitor and an operator of the control system, when the resident is not available to speak with the visitor via the communication device or the mobile communication device; and providing access to the building for the visitor based upon one or more predetermined criteria, the visitor profile, and the resident profile.

* * * * *